Dec. 24, 1957  C. J. COBERLY  2,817,411
PROCESS OF AND APPARATUS FOR SEPARATING TARS FROM GAS MIXTURES
Filed Jan. 21, 1955  5 Sheets-Sheet 3
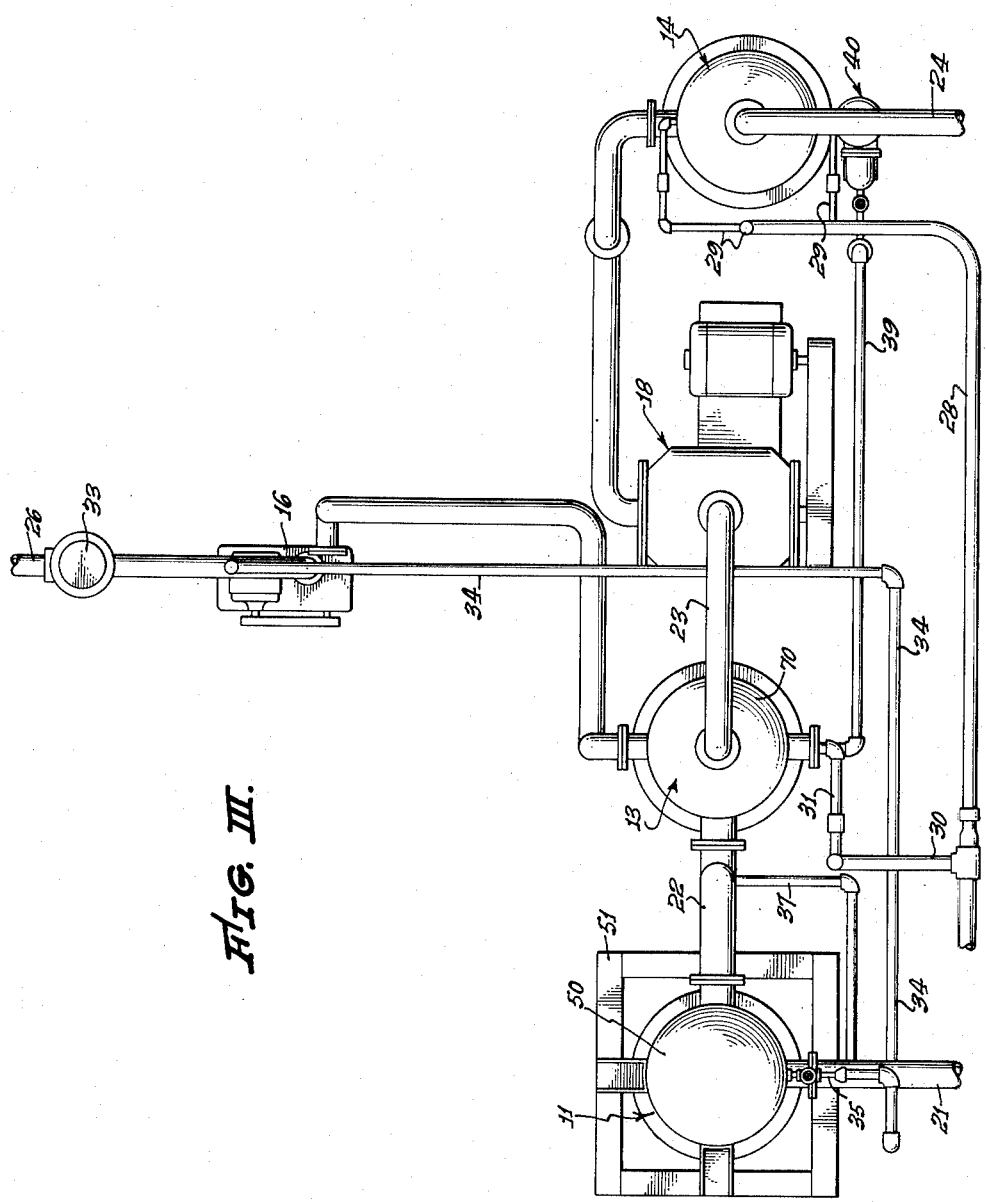
FIG. III.
CLARENCE J. COBERLY,
INVENTOR.
By His ATTORNEYS.
HARRIS, KIECH, FOSTER & HARRIS.

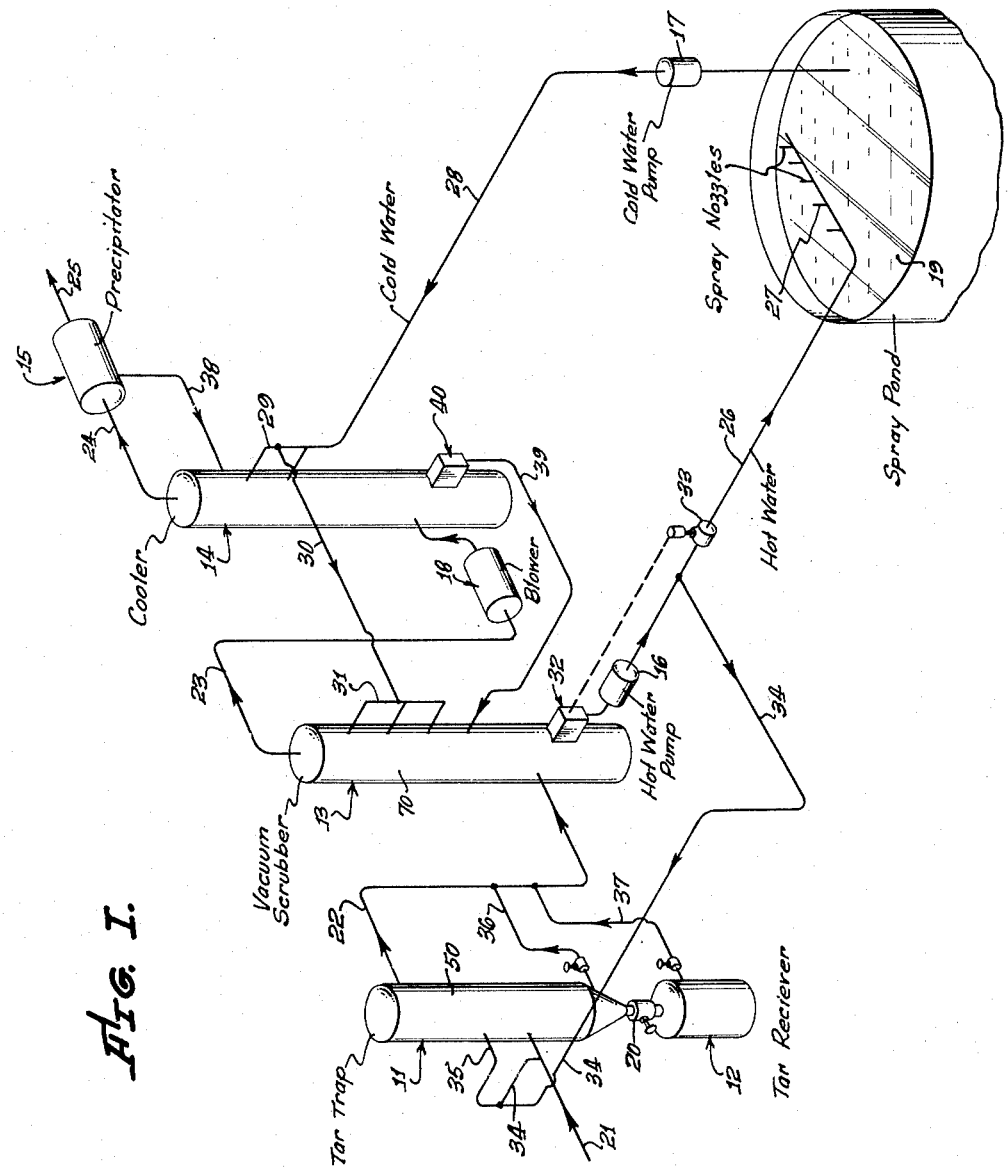

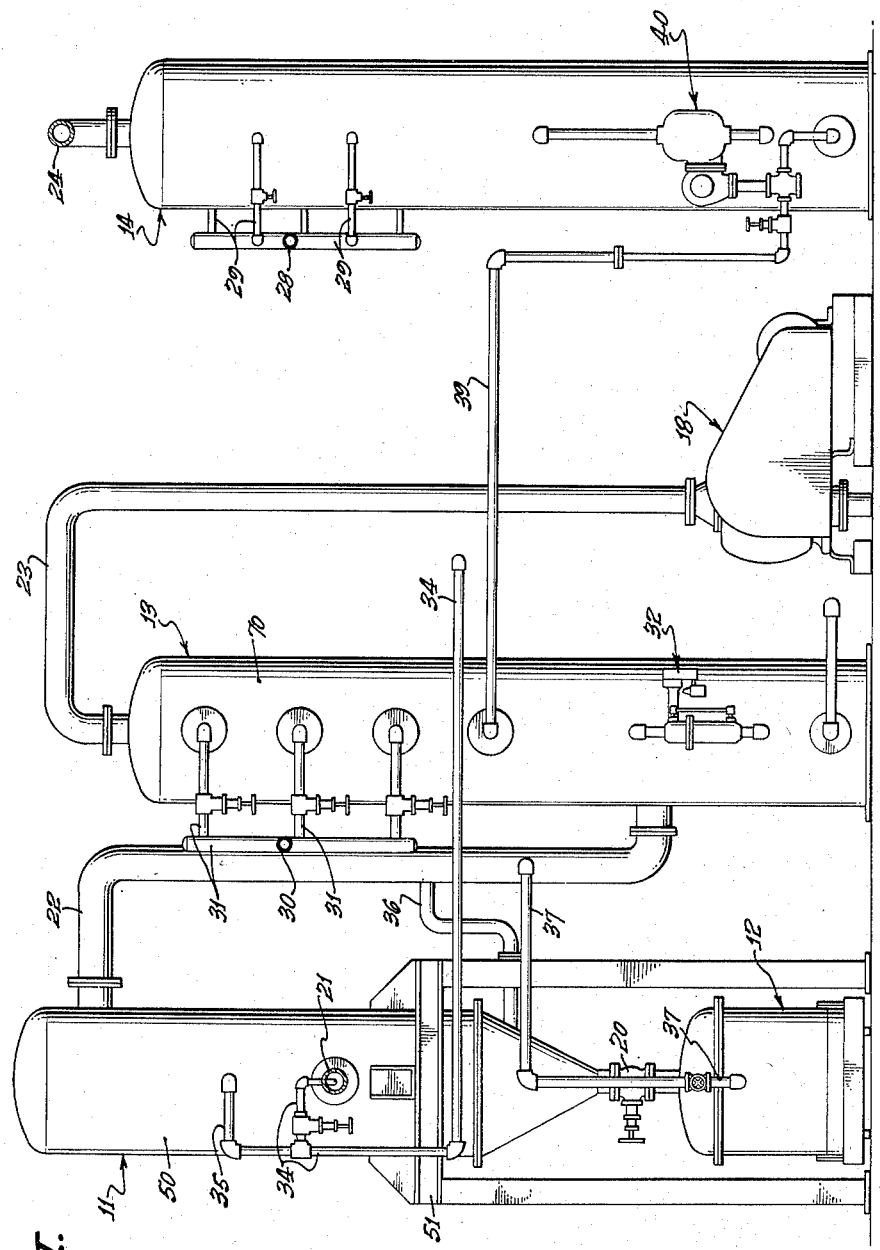
Fig. II

Dec. 24, 1957  C. J. COBERLY  2,817,411
PROCESS OF AND APPARATUS FOR SEPARATING TARS FROM GAS MIXTURES
Filed Jan. 21, 1955  5 Sheets-Sheet 4
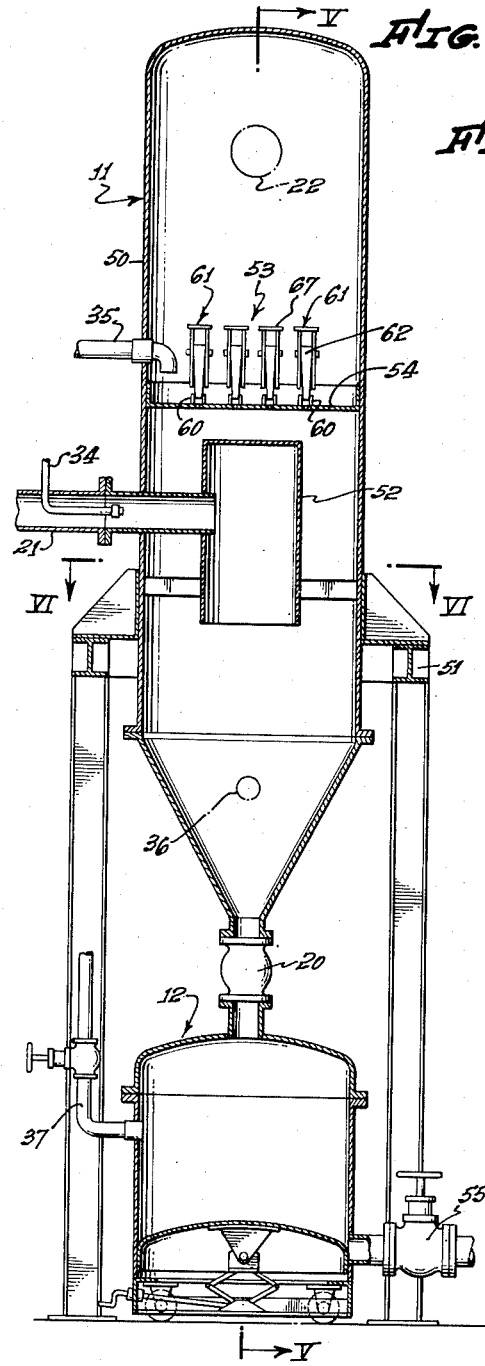
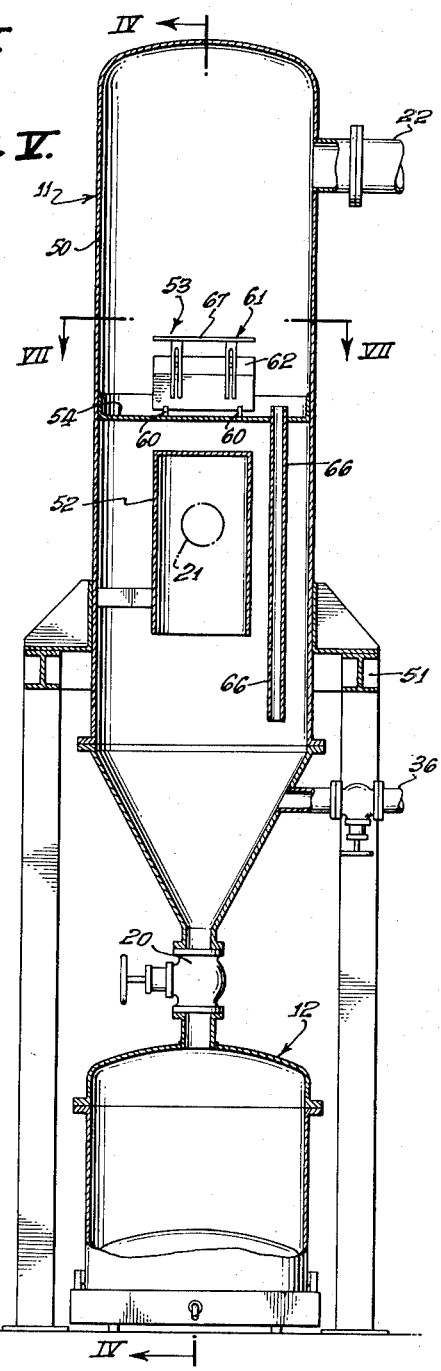
CLARENCE J. COBERLY,
INVENTOR.
By His Attorneys.
HARRIS, KIECH, FOSTER & HARRIS.

Dec. 24, 1957 — C. J. COBERLY — 2,817,411
PROCESS OF AND APPARATUS FOR SEPARATING TARS FROM GAS MIXTURES
Filed Jan. 21, 1955
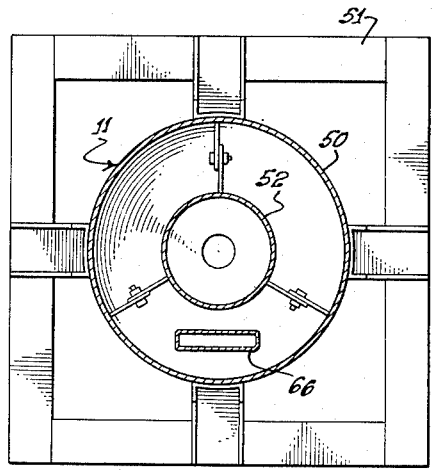
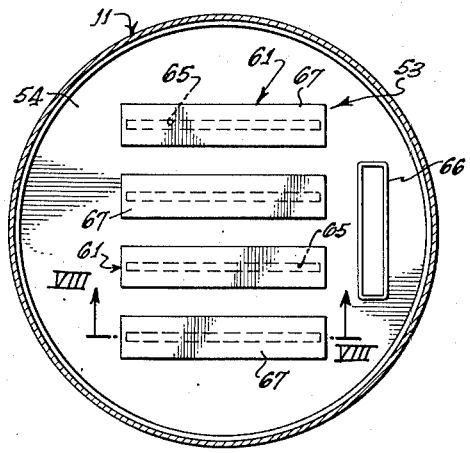
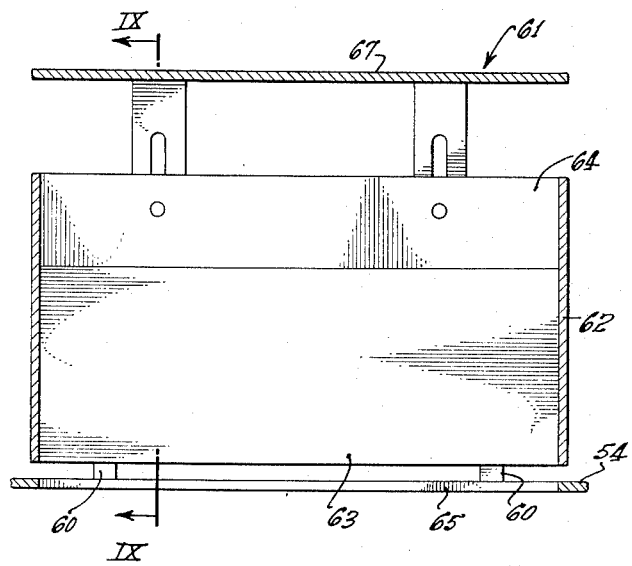
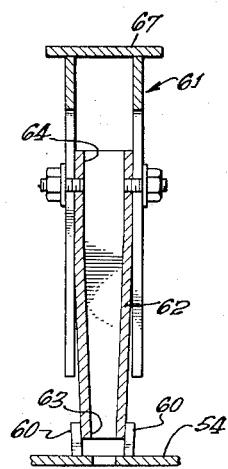
CLARENCE J. COBERLY,
INVENTOR.
By His Attorneys
HARRIS, KIECH, FOSTER & HARRIS.

United States Patent Office 2,817,411
Patented Dec. 24, 1957

2,817,411

PROCESS OF AND APPARATUS FOR SEPARATING TARS FROM GAS MIXTURES

Clarence J. Coberly, San Marino, Calif., assignor to Wulff Process Company, Huntington Park, Calif., a corporation of California Application January 21, 1955, Serial No. 483,311

7 Claims. (Cl. 183—2)

Briefly summarized, the apparatus consists of means for removing tars from a mixture of gases including a desired hydrocarbon, as hereinafter defined. The process consists of a method of removing tars from a mixture of gases including the desired hydrocarbon.

Certain objects and advantages will be made evident hereinafter.

In the drawings:

Fig. I is an isometric and somewhat diagrammatic view of the main pieces of apparatus needed to perform the process hereinafter described;

Fig. II is an elevation of a portion of the apparatus shown in Fig. I;

Fig. III is a plan view of the apparatus shown in Fig. II;

Fig. IV is a section through the tar trap and receiver on a plane defined by by the axis IV—IV in Fig. V;

Fig. V is a section of the tar trap and receiver on a plane defined by the axis V—V in Fig. IV;

Fig. VI is a section through the tar trap on a plane defined by the axis VI—VI of Fig. IV;

Fig. VII is a section through the tar trap on a plane defined by the axis VII—VII of Fig. V;

Fig. VIII is a section of a portion of the trap on the axis VIII—VIII of Fig. VII; and Fig. IX is a section taken on the axis IX—IX of Fig. VIII.

The apparatus shown in Fig. I and the other figures consists of a tar trap 11, a tar receiver 12, a vacuum scrubber 13, an atmospheric scrubber or cooler 14, a precipitator 15, a hot water pump 16, a cold water pump 17, a blower 18, and a cooling pond 19. The tar receiver 12 is connected to the lower end of the tar trap 11 through a valve 20.

The principal units above listed are connected together and to various other devices as follows:

The gaseous mixture from which it is desired to remove the tars is delivered to the tar trap 11 through a pipe 21 and, after passing upwardly through the tar trap, this gaseous mixture from which some tar is removed is delivered through a pipe 22 to a point near the bottom of the vacuum scrubber 13 and, after passing upwardly through the scrubber 13, is delivered through a pipe 23 to the blower 18. This blower maintains a vacuum of about 15" of mercury on the tar trap 11 and the scrubber 13 and back through the pipe 21 to apparatus not shown. The blower 18 delivers the gaseous mixture received from the scrubber 13 to the lower portion of the cooler 14 and this mixture, after passing upwardly through the cooler, is delivered by a pipe 24 to the precipitator 15.

The gaseous mixture delivered to the tar trap 11 through the pipe 21 may consist of about 50% by volume of superheated steam which, of course, behaves according to the natural laws governing the behaviour of gases.

The cooling pond 19 plays an important part in the practice of the invention. The temperature of the water depends to a large degree on the size of the pond and atmospheric temperature and atmospheric humidity. The water is herein referred to as "cold" water which, of course, involves a substantial variation in temperature. The supply of cold water used may be varied as the seasons change. The method and means by which the water is used will be now described.

Hot water, that is, water at perhaps 140° F., is drawn from the bottom of the vacuum scrubber 13 by the hot water pump 16 and delivered at a superatmospheric pressure through a pipe 26 to spray nozzles 27 which discharge over and into the spray pond 19. The vacuum scrubber 13 and tar trap 11 are maintained at a vacuum of about 15" of mercury during the entire operation of the process. The cold water is taken from the pond 19 by the cold water pump 17 and delivered through pipes 28 and 29 to spray nozzles (not shown) in the upper part of the cooler 14. This cold water from the pipe 29 is also delivered through pipes 30 and 31 to spray nozzles (not shown) in the upper part of the scrubber 13. The flow of hot water through the pipe 26 is controlled by a pneumatically operated valve 33 which is controlled by a float control 32 so arranged that it closes the valve 33 whenever the level of the water in the bottom of the vacuum scrubber 13 falls below a certain level. Hot water from the pipe 26 is delivered through a pipe 34 to a spray nozzle (shown in Fig. IV) in the interior of the pipe 21 to supply a primary quench to the gas being delivered to the tar trap 11.

Water is taken from the pipe 34 and a pipe 35 into the tar trap 11 near the top thereof, as shown in Fig. IV. Water is delivered through a pipe 36 from the lower portion of the tar trap 11 into the pipe 22 and water is delivered through a pipe 37 from the tar receiver 12 to the pipe 22. The waste liquid recovered in the precipitator 15 is delivered through a pipe 38 into the upper part of the cooler 14. Water is taken from the lower portion of the cooler 14 through a pipe 39, the flow of this water being controlled by a float valve 40, and delivered through a nozzle (not shown) into the upper portion of the vacuum scrubber 13.

The water from the bottom of the scrubber 13 is delivered to the hot water pump 16 and is delivered from that pump to the spray nozzles 27 through the pipe 26 and back to the tar trap 11 through the pipe 34. The flow of hot water to the spray nozzles 27 through the pipe 26 is shut off at the valve 33 whenever the level of water in the bottom of the scrubber 13 falls sufficiently low to operate the float 32. Since water flows back from the bottom of the cooler 14, the tar trap 11 and the tar receiver 12, all water which is taken out of the apparatus must flow through the pipe 26. The valve 33 is operated by air pressure controlled by the float 32.

The process and apparatus herein described have a special utility in removing tars from a mixed gas produced by the pyrolysis of a suitable hydrocarbon such as methane, ethane, propane, butane, or a natural gas or gasoline or a petroleum fraction such as gas oil. The product of this pyrolysis will contain a substantial proportion of a desired hydrocarbon such as acetylene or ethylene and will also contain tars, free carbon, free hydrogen, various hydrocarbons and water in the form of superheated steam. If the pyrolysis occurs at a sufficiently high temperature to deliver gas containing a substantial proportion of acetylene or other desired hydrocarbon, this delivered gas will necessarily contain tars which are aromatic hydrocarbons which have very little affinity for petroleum fractions which have been formed at ordinary cracking temperatures. It is well known that these aromatic hydrocarbons can be and will be produced in quantity by the pyrolysis of a large number of gaseous hydrocarbons at temperatures of 700° C. and over, and that to produce acetylene such temperatures must be used. It is highly desirable to dilute the tars produced in the pyrolysis of hydrocarbons at high temperatures and low partial pressures, this dilution lowering the gravity and viscosity of the tars and promoting the separation of such tars from wash waters, but the aromatic tars cannot be diluted with nonaromatic petroleum derivatives such as gasoline or other nonaromatic solvents such as acetone, and the aromatic solvents now commercially available are quite expensive. The gas which enters the tar trap 11 through the pipe 21 contains aromatic hydrocarbons and a substantial percentage of these aromatics are somewhat lighter than water and form an excellent solvent for the heavier aromatic tars. It is therefore an object of the invention to conserve these light aromatic hydrocarbons and reuse them to soften up the aromatic tars.

The tar trap 11 consists of a cylindrical gas-tight metal shell having a vertical axis V—V. The shell 50 is suspended on a frame 51 above the tar receiver 12. Heavy tar can settle out of the tar trap through the valve 20 between the trap and receiver, this valve being kept open during normal operation. The hot gas is delivered to the interior of the tar trap 11 through the pipe 21, which delivers the gas to a cylindrical chamber 52 having a closed top. As the hot gas enters the pipe 21 it contains among other things a substantial proportion of tars, some of which are aromatics. The water delivered through the pipe 34 contains a substantial proportion of light aromatic solvents, as does the water delivered through the pipe 35. The hot gas is given a first quench by the spray from the nozzle fed by the pipe 34.

The function of the quick quench is to prevent a very hot gas containing tars which condense at a lower temperature from so condensing on much cooler walls in the tar trap. The bulk of the tars so condensed is condensed in the stream of gas passing into the tar trap. The water level in the lower portion of the tar trap is maintained by the pipes 36 and 37 somewht below the bottom of the cylindrical chamber 52. The gas-steam mixture passes downwardly through the chamber 52 and upwardly through the annular space between the wall of the chamber 52 and the shell 50 to an emulsifier 53 which is supported in a pan 54. The function of the emulsifier is to collect tars from the steam-gas mixture and to emulsify, or cause a suspension of, the tars and water. A flushing valve 55 is provided in an outlet pipe near the bottom of the tar receiver.

The features of the emulsifier are well shown in Figs. VI, VII, VIII and IX. Supported a short distance above the upper surface of the pan 54 by small supports 60 are four emulsifying units 61. Each of these units consists of an injector 62 which has a constricted throat 63 at its lower end and a wider opening 64 at its upper end. A narrow slot 65 in the pan 54 is provided below each of the throats 63 so that the steam-gas mixture after it passes upwardly is jetted upwardly into each of the throats 63. Hot water delivered into the pan 54 through the pipe 35 leaves the pan 54 through a rectangular conductor 66, the lower end of which extends well below the surface of the water maintained at all times in the tar trap 11, the upper end of which is only slightly below the level of the water, above the throats 63, which is maintained in the pan 54. Since the narrower end 63 of each of the units 61 is always immersed in the water of the pan, the jetting of steam-gas mixture into the throats pulls water into the throats. The mixture of water and steam-gas mixture impinges on a flat plate 67 held above the upper end of the units 61. A mixture of water and tar collects on this plate and escapes therefrom down into the pan 54 and through the conductor 66 down into the bottom of the tar trap.

In the emulsifier 53 the water from the pan is repeatedly pulled upward in very intimate contact with the upward flowing gas stream and almost all the tar particles are trapped in the water and carried down into the tar trap 11 through the conductor 66. This is particularly true of the high boiling tars which would otherwise condense on a surface at a temperature below the boiling point of these tars but which would still be quite hot, for example at 300° F. to 700° F. By cooling the mixture by the quick quench, the condensation takes place in the body of the gas and the condensed particles do not condense in any substantial proportion on the walls of the tar trap or tar receiver. In practice, the tar trap may be operated at an internal temperature as low as 140° F.

The tar receiver 12 normally receives hot water loaded with tar from the tar trap 11 and the heavy tars tend to settle out. Heavy tars will gradually collect in the tar receiver and periodically they must be removed. To so remove the tars, the valve 20 and the valve in the pipe 37 (see Fig. V) are closed, the valve 55 being also closed. The connection of the valve 20 and the pipe 37 is broken from the tar reeciver before it is wheeled out into a space where the top of the receiver can be removed. If the valve 55 is then opened, a high pressure jet of water from the nozzle of a flexible hose (not shown) will hydraulic the heavy tar out through the valve 55.

It is highly desirable to keep as much air as possible out of the apparatus previously described and before the tar receiver is put back into service it is completely filled with hot water through the pipe 37. This is accomplished by closing the valve 55, reconnecting the pipe 37 to the receiver 12 without making a final connection to the valve 20. The valve in the pipe 37 is then opened long enough to fill the receiver with hot water then the valve in the pipe 37 is closed, the connection to the valve 20 is replaced and the valve in the pipe 37 is opened and the tar receiver is again in normal operation.

Aromatic tars lighter than water will accumulate on the surface of the water in the tar trap and will pass through the pipe 36 to the pipe 22 and through this pipe to the vacuum scrubber. These lighter tars play an important part in the process, as will be further explained.

To keep the tar receiver 12 hot, hot water is constantly being withdrawn from the receiver through the pipe 37, this water being delivered to the pipe 22 and through that pipe to the bottom of the vacuum scrubber 13. This partially cooled water is replaced by hot water delivered to the receiver from the bottom of the tar trap 11 through the valve 20.

The gas delivered to the tar trap contains about 60% of superheated steam which acts like a gas and could therefore properly be called a gas. The volume of the gas is increased slightly due to evaporation water being added in the pipe 21 and through the pipe 35. Gas delivered from the tar trap 11 to the vacuum scrubber 13 through the pipe 22 contains more than 60% by volume of saturated steam.

The vacuum scrubber 13 consists of a cylindrical steel shell 70 which has internal spray nozzles near the top thereof fed by the pipes 31 and 39. The pipes 30 and 31 deliver cold water from the pond 19 through the pump 17, and the pipe 39 delivers hot water from the bottom of the cooler 14. The float valve 32 controls valve 33 and shuts off the discharge of water from the scrubber 13 whenever the level of water in the bottom of the vacuum cooler falls below a predetermined level.

The blower 18 may be of any convenient type and it pulls gas out of the system through the pipe 23 (maintaining a vacuum of about 15" of mercury in the vacuum scrubber 13), the tar trap 11 and back through the pipe 21 to the furnaces (not shown) from which the gas is delivered to the tar trap 11 through the pipe 21. The blower 18 delivers gas to the cooler 14 at a slight superatmospheric pressure.

The cooler 14 is also a cylindrical steel shell. Cold water delivered to the pipe 28 by the cold water pump 17 is delivered to spray nozzles in the upper part of the cooler. An increase of gas pressure occurs on the saturated steam in the gas delivered through the pump and this increase in pressure condenses some of the steam and tends to raise the temperature of the gas. Enough cold water is supplied through the pipe 28 to prevent such an increase in pressure and cause an almost complete condensation of the steam in the gas stream. The cooling water and the water so produced are fed back through the pipe 39 into the vacuum scrubber 13. The precipitator 15 collects some last residual particles of tar which are so small that they float in the gas, leaving the cooler 14 through the pipe 24. In practice the separated material delivered back to the cooler 14 through the pipe 38 is a light, low viscosity oil.

It has been found that the primary quench, described above, is essential to the proper operation of this system. If it is not used, the tar will be carried up to the emulsifier 53 and will fill the venturi nozzles 62 in a very short time to where they are inoperative. When operating, as described above, the tar trap may be used continuously without clogging. If the primary quench is not used, it will become inoperative in 24 to 48 hours.

The velocity of the gases through the tar trap, the nozzles, and the associated pipe is important. It has been found that velocities shown in the following table give satisfactory results:

*Gas velocity in tar trap and piping*

| Location | Velocity, ft./sec. |
|---|---|
| Piping from furnace | 75-200 |
| Valve plugs | 100-300 |
| Entrance to tar trap | 20- 60 |
| Down pipe in tar trap | 4- 12 |
| Vertical velocity in tar trap | 1- 3 |
| Throat of scrubbers in tar trap | |
| Shell of tar trap | ¾-2¼ |
| Exit of tar trap | 20- 60 |

The gas-steam mixture leaving the tar trap is carried to the bottom of the vacuum scrubber in which it is spray-cooled with water fed from the cooling pond by the pump 17. This water will have a temperature related to the atmospheric conditions and may have a maximum of approximately 80° F. This water will cool the gas in the vacuum scrubber 13 to approximately 90° F. and condense 95% of the dilution steam. The water leaving the bottom of this scrubber through the pipe 26 will be approximately 140° F. since the gas steam mixture is entering at approximately 150° F. Water from the bottom of this scrubber is pumped through the spray nozzles 27, the cooling pond by the pump 16, and again cooled to 80° F. or below. Part of the hot water is also pumped through the pipe 34 to the pan 54 of the tar trap and to the primary quench, as outlined above. The overflow from the tar trap enters at 150° F. and moves upward to the spray nozzles fed by the pipe 28 at an initial velocity of ¾ to 2¼ F. P. S. and leaves the top at less than one half of the entering velocity as the volume is decreased by almost a factor of two due to the condensation (95%) of the steam and then further reduced due to the temperature change by a factor of 10%.

Spray nozzles are arranged, with a series of manifolds with a valve for each. Therefore, these nozzles may be shut off or reduced in capacity as required to obtain the proper cooling. As pointed out above, it is desirable to keep the bottom temperature at 140° F. A liquid level controller is provided which throttles the outlet of the pump delivering water to the spray pond so that the pump is always provided with flooded suction and water is withdrawn at a constant rate equal to that of the incoming water.

Compression of the gas to atmospheric pressure in the blower 18 again heats the gas and this heat of compression is removed in the atmospheric scrubber 14 by spray nozzles fed by the pipe 28. Water for this column is supplied from the spray pond by the pump 17. Water from the bottom of this column is returned to a lower set of spray nozzles in the vacuum column 13 by a pipe 39. Since the two columns are at different pressures, this water is returned to these spray nozzles without a pump. Acetylene and some of the other gases produced have a considerable solubility in the water and also in the oil which is emulsified into the water from tar trap scrubbing. By returning this water to the vacuum scrubbing column before it is pumped to the spray pond, this gas is flashed out in the vacuum column and the loss of gas is very materially reduced.

The process disclosed in the preceding specification may be described as follows. Reference has been previously made to the light aromatic solvent. This solvent collects on the top of the pond, being released as the heavier tars settle to the bottom of the pond, and in practice a substantial proportion of heavy tar accumulates in the bottom of the pond. The solvent condenses at temperatures above 140° F. and, hence, is condensed in the tar trap 11, the scrubber 13, the cooler 14, and the precipitator 15. Very little of the solvent is carried over into the pipe 25. Since some small proportion of such solvent is present in the gas delivered through the pipe 21 to the tar trap 11 and since there is no point at which it is taken from the system, the solvent tends to accumulate in the top of the pond 19 and to be delivered with the cold water. In practice some solvent may be lost through retention in the heavy tars. In any event, such solvent is present in the water delivered through the pipe 34 to the primary quench. The water also contains microscopic tar particles which are too small to settle out in the pond 19. These particles form nuclei for the agglomeration of larger particles.

The tar trap has the function of partially separating tars from the gas stream. It has been found that any cooling of a passage carrying cracked gas will cause tar to build up and eventually materially restrict the gas flow. To avoid this build-up, it has been found necessary to inject water at a point just before the gas enters the tar trap. This is done with a single pipe 34 of small size which is fed with hot water from a pipe 26 and which carries a single spray nozzle pointing downstream and located on the centerline of the cracked gas pipe. The heat conduction from the main gas line to this water pipe is sufficiently low that no tar build-up occurs. Any tar which builds up on the water pipe will not adhere in sufficient quantity to obstruct the flow. Any build-up which does occur will break off and be carried with the gas. The amount of water used in this spray need only be sufficient to quench the gas by evaporation of the water to the equilibrium temperature. This will be approximately 150° F. when operating at 15" of vacuum as the volume of cracked gas will be about equal to the steam used for dilution, and, therefore, the partial pressure of the steam will be about 7½" Hg. At this pressure the temperature of saturated vapor will be about 150° F. When producing 300 S. C. F. M. of cracked gas or 30 S. C. F. M. of acetylene, approximately 300 S. C. F. M. of steam will be used. The temperature of this gas as it enters the tar trap will be 750° F. and the water evaporation required to cool 300 S. C. F. M. of cracked gas and 300 S. C. F. M. of steam to 150° F. will be 8.3 lbs. or 1.0 G. P. M. A large flow of water is used for margin of safety but making this stream 10 or 20 G. P. M. would only reduce the temperature by an additional 1 to 2° F. as the cooling must come entirely from the increase in temperature on this quantity of water as the gas is already saturated and no further evaporation can occur. The water supplied is preferably at a temperature of 140° F.

As the gas leaves the primary quench it is turned downwardly. At the bottom of this section just above the surface of the water the gas turns upward through the annulus between this cylinder and the tar trap outer shell. This change in direction causes some of the tar to drop out into the water below. This water is also hot so any heavy tar will remain soft and semifluid. The light oil which is trapped out at this point remains on top of the water. The heavy tar referred to above will be heavier than water and will sink to bottom through the conical section and will eventually collect in the tar receiver or in the pond.

Immediately above the cylindrical section which turns the gas downward is a water scrubber section where the gas comes into intimate contact with water and facilitates tar removal. When the mixture of tar and water forced upwardly through each of the units 61 strikes the deflector plate of that unit most of the water containing entrained tars is knocked out by impact and change of direction and returns to the basin where it again is drawn in with the gas. This short circuit path for the water causes a very large circulation with intimate contact with the gas which is the primary requirement in removing tar from the gas stream. The amount of hot water which is fed to this scrubber also is not sufficient to greatly reduce the temperature of the gas and, hence, the water and the entire tar trap stay hot and any tars which are separated from the gas and which tend to adhere will be sufficiently soft to flow and will eventually reach the tar receiver by gravity drainage. Water which is also hot, 140° F., is supplied to this basin for make-up, and the excess overflows the conductor 66 which extends nearly to the water level in the lower part of the trap. The water level is maintained at the point by the overflow pipe 36 which carries this liquid over to the scrubber 13.

Sometimes it is desirable to provide two of these circulating scrubbers in series to affect a more complete removal of the tar. In this case, the water is supplied to the upper scrubber at 140° F. and this water overflows through a down pipe to the lower scrubber.

I claim as my invention:

1. An apparatus for removing tar from a gas, comprising: a tar trap; a pipe through which a gas is delivered to said tar trap; an injector delivering water to said gas at the point where the gas enters the tar trap; a vacuum scrubber; a pipe by which gas is delivered from said tar trap to said vacuum scrubber; a blower so placed as to draw gas from said tar trap and said scrubber and so maintain a vacuum therein; a container carrying a bulk supply of water; pipe means including a cold water pump for delivering cold water from said bulk supply to spray means in said vacuum scrubber; spray means delivering hot water as spray over and into said bulk supply of water; and a pipe delivering hot water from said vacuum scrubber to said spray means.

2. An apparatus for removing tar from a gas comprising: a tar trap; a pipe through which a gas is delivered to said tar trap; an injector delivering water to said gas at the point where the gas enters the tar trap; a vacuum scrubber; a pipe by which gas is delivered from said tar trap to said vacuum scrubber; a blower so placed as to draw gas from said tar trap and said scrubber and so maintain a vacuum therein; a container carrying a bulk supply of water; pipe means including a cold water pump for delivering cold water from said bulk supply to spray means in said vacuum scrubber; an atmospheric scrubber; a pipe through which gas is delivered at superatmospheric pressure from said blower to said atmospheric scrubber; pipe means for delivering cold water from said bulk supply to spray means in said atmospheric scrubber; spray means delivering hot water as spray over and into said bulk supply of water; and a pipe delivering hot water from said vacuum scrubber to said spray means.

3. An apparatus for removing tar from a gas, comprising: a tar trap; a pipe through which a gas is delivered to said tar trap; an injector delivering water to said gas at the point where the gas enters the tar trap; a vacuum scrubber; a pipe by which gas is delivered from said tar trap to said vacuum scrubber; a blower so placed as to draw gas from said tar trap and said scrubber and so maintain a vacuum therein; a container carrying a bulk supply of water; pipe means including a cold water pump for delivering cold water from said bulk supply to spray means in said vacuum scrubber; an atmospheric scrubber; a pipe through which gas is delivered at superatmospheric pressure from said blower to said atmospheric scrubber; pipe means for delivering cold water from said bulk supply to spray means in said atmospheric scrubber; pipe means delivering warm water from said atmospheric scrubber to spray means in said vacuum scrubber; spray means delivering hot water as spray over and into said bulk supply of water; and a pipe delivering hot water from said vacuum scrubber to said spray means.

4. In a process for removing tar from a hot gaseous mixture of hydrocarbons, tar, and steam, the steps of: injecting into a flowing stream of said mixture a hot liquid containing a solvent for the tar; passing said mixture and said liquid into a first zone maintained at subatmospheric pressure and therein removing from said mixture a substantial portion of said tar and said liquid having tar in solution therein; conveying the balance of said mixture into a second zone maintained at subatmospheric temperature and therein scrubbing the same with a cold liquid to remove further tars therefrom; and injecting into said balance of the mixture passing from the first to the second zone at least a portion of the liquid separated in said first zone.

5. An apparatus for removing tar from a gas, comprising: a tar trap; a pipe through which a gas is delivered to said tar trap; an injector adapted to deliver a liquid into said pipe at a point adjacent said tar trap; a vacuum scrubber; a pipe by which gas is delivered from said tar trap to said vacuum scrubber; a blower so placed as to draw gas from said tar trap and said scrubber and so maintain a vacuum therein; a container carrying a bulk supply of water; pipe means including a cold water pump for delivering cold water from said bulk supply to spray means in said vacuum scrubber; spray means delivering hot water as spray over and into said bulk supply of water; a pipe delivering hot water from said vacuum scrubber to said spray means; and injection pipe means connecting said last mentioned pipe and said injector for supplying liquid from said last mentioned pipe to said injector.

6. In a process for removing tar from a hot gaseous mixture of hydrocarbons, tar, and steam, the steps of: conveying through a closed conduit a flowing stream of said mixture maintained at a temperature substantially in excess of the condensation temperature of the tar therein; injecting into said flowing stream a liquid containing water and solvent for the tar; immediately discharging said mixture and said liquid into a first zone maintained at subatmospheric pressure, to evaporate the water contained in the liquid to substantially cool said mixture and to condense and remove at least a part of the tar therefrom in said first zone; conveying the balance of said mixture into a second zone maintained at subatmospheric pressure and therein scrubbing the same with a cold liquid to remove further tars therefrom; conveying liquid containing tars from said second zone to a bulk supply of liquid; returning some of the liquid passing from said second zone to serve as the liquid injected into said flowing stream; and cooling and returning some of the liquid passing from said second zone to serve as the cold liquid employed in said scrubbing in said second zone.

7. In a process for removing tar from a hot gaseous mixture of hydrocarbons, tar, and steam, the steps of: conveying through a closed conduit a flowing stream of said mixture maintained at a temperature substantially in excess of the condensation temperature of the tar therein; injecting into said flowing stream a liquid containing water and solvent for the tar; immediately discharging said mixture and said liquid into a first zone maintained at subatmospheric pressure, to evaporate the water contained in the liquid to substantially cool said mixture and to condense and remove at least a part of the tar therefrom in said first zone; conveying the balance of said mixture into a second zone maintained at subatmospheric pressure and therein scrubbing the same with a cold liquid to remove further tars therefrom; conveying liquid containing tars from said second zone to a bulk supply of liquid; returning some of the liquid passing from said second zone to serve as the liquid injected into said flowing stream; cooling and returning some of the liquid passing from said second zone to serve as the cold liquid employed in said scrubbing in said second zone; conveying the balance of said mixture from said second zone into a third zone maintained at atmospheric pressure and therein scrubbing the same with a cold liquid to reduce the temperature thereof to condense substantially all steam remaining in said mixture; conveying the balance of said mixture from said third zone; and returning liquid condensate and scrubbing liquid from said third zone back into the system.

References Cited in the file of this patent

UNITED STATES PATENTS

| | | |
|---|---|---|
| 2,585,659 | Kilpatrick | Feb. 12, 1952 |
| 2,676,670 | Gagnaire | Apr. 27, 1954 |
| 2,747,680 | Kilpatrick | May 29, 1956 |